Nov. 1, 1966

D. I. STEELE 3,282,103

MASS FLOWMETER

Filed Oct. 7, 1963

INVENTOR
DALE I. STEELE

BY *Fidelman & Wolffe*

ATTORNEYS

United States Patent Office 3,282,103
Patented Nov. 1, 1966

3,282,103
MASS FLOWMETER
Dale I. Steele, Silver Spring, Md., assignor to National Instrument Laboratories, Inc., Rockville, Md., a corporation of Maryland
Filed Oct. 7, 1963, Ser. No. 314,296
5 Claims. (Cl. 73—210)

This invention relates to fluid flow measurement. More particularly, this invention relates to an arrangement for measuring the mass rate of flow.

The primary object of this invention is to provide a device for accurately measuring the mass rate of flow of a fluid through a conduit.

Further objects and the advantages of this invention will be apparent from the description which follows.

Conventional orifices, nozzles, and venturi tubes produce a differential pressure which is proportional to the product of the fluid density and the square of the volume rate of flow. It can then be shown that the product of the density and the differential pressure is proportional to the square of the mass rate of flow of the fluid. It is one of the purposes of this invention to provide a structure which compensates accurately for changes in density of a gasiform fluid due to changes in pressure and temperature to produce thereby a differential pressure proportional to the square of the mass rate of flow of the fluid over a flow range being measured. The square root of the pressure differential ($\Delta P$) becomes proportional to the mass flow rate (M) and measurement of the pressure differential will then determine the mass flow rate of the gas.

This desired object is attained by providing a plate member or an equivalent structure transversely disposed across the fluid flow path, with an opening in the plate through which fluid flows. The opening is formed into an annular orifice by a shaped, relatively movable plug disposed centrally of the opening. Relative movement of the plug and plate is effected by a sealed pressure-temperature responsive element, i.e., a bellows. It can be demonstrated mathematically that the square root of the pressure drop through such an annular orifice is a unique measure of the mass flow rate, provided the effective area of the orifice multiplied by the square root of the density is maintained constant.

Essentially all that is necessary is that L be a unique function of $\rho$ (not necessarily proportional to $\rho$) and that $$A = K\sqrt{\rho} \tag{1}$$

where A is the orifice area, L is the bellows length, K is a constant, and $\rho$ is the density of the gas.

Thus when a shaped plug is formed so that the annular area of the orifice through which the gas flows is proportional to the square root of the density which is in turn dependent upon the gas temperature and pressure and which predetermines the bellows length (and therefore the position of the plug), then the square root of the differential pressure across the annular orifice is proportional to the mass rate of flow of the gas.

Mass flow meters constructed according to the above outlined principles are known to the art. Specific reference is made to Patent 3,103,119 for such a flow meter construction and for a fuller explanation of the theory underlying the mass flow meter. Still another mass flow meter based on the same general principles but employing a different construction is represented by Patent 2,816,441.

In the design and construction of mass flow meters based upon the above noted principles it is either assumed that the spring constant of the bellows was negigible, or where this assumption was too inaccurate, that the plug itself can be shaped in a manner which will properly compensate the meter for pressure and/or alternatively temperature variations of the flowing gas. Unfortunately, many instances exist where the compensation required for both temperature and pressure variations cannot be attained by shaping the plug, and a relatively inaccurate mass flow meter results.

It has now been discovered that temperature compensation for the spring constant of the bellows can be made internally of the bellows; thereby a more accurate mass flow meter can be provided.

Briefly stated, the present invention involves employing a sealed bellows containing in addition to the charging gas a condensable fluid, which fluid is in liquid state over at least part, often all, of the intended range for the mass flow meter. Thus, at least at the one extreme, design conditions of maximum pressure and minimum temperature for the gas whose mass flow is to be measured (whereunder the bellows would be most collapsed) the sealed bellows contains a two phase system, i.e., gas and liquid, the latter being, of course, the condensable fluid in liquid state.

The partial pressure of a vapor above its liquid phase depends essentially on temperatures remaining unaffected by changes in absolute pressure. Thus at maximum pressure and minimum temperature the condensable fluid is least in vapor phase and the most in liquid phase. According to the practice of the present invention, from 0.5% to 25% of the bellows volume is occupied by the liquid under these minimum conditions. At the opposite extreme design condition, namely the lowest pressure and the highest temperature for the flowing gas, the bellows contains in vapor phase the greatest amount of the condensable fluid charge. Expressly within the contemplation of the present invention is the circumstance (under this extreme design condition) where all of the condensable fluid has become vaporized and a single (gas) phase system is present inside the sealed bellows. According to the practice of this invention, generation of additional gas inside the bellows is made to compensate for the spring constant of the bellows over design changes in the bellows length attributable to temperature variations in the metered gas by proper selection of the condensable fluid and of the quantity of condensable fluid inside the bellows. Now the plug can be shaped solely to provide compensation for the expected pressure variations in the metered gas. Overall, a more accurate mass flow meter results.

For further understanding of the present invention reference is made to the attached drawing, wherein FIGURE 1 diagrammatically illustrates a cross-sectional view of a mode of mass flow meter to which the present invention is particularly adapted;

Figure 1:
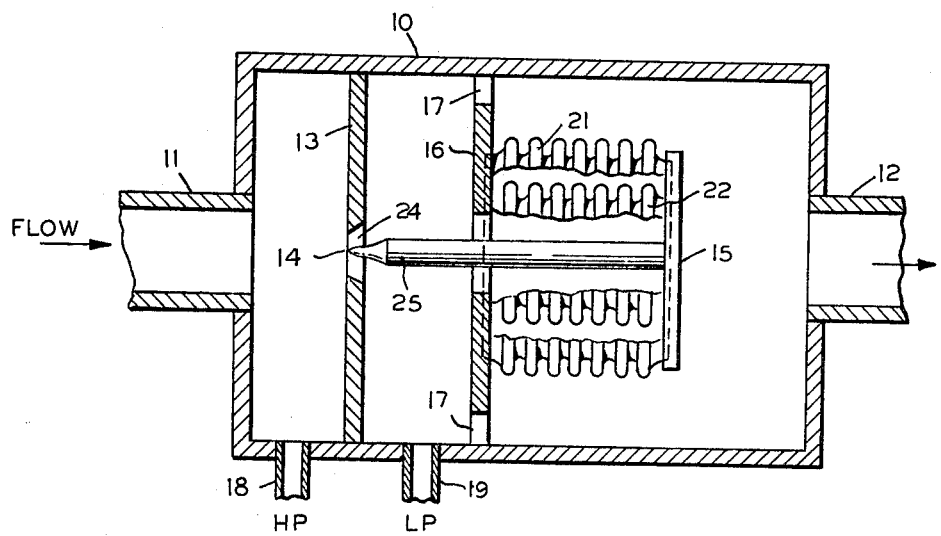
Figure 2:
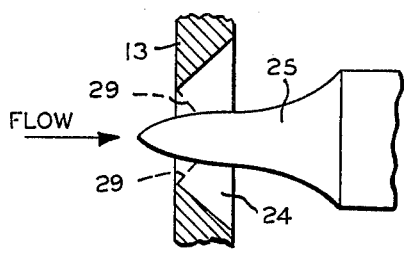
FIGURE 2 is a fragmentary cross-sectional view on an enlarged scale illustrating the relationship of the plate and the orifice in the flow meters constructed according to the practice of the present invention.

By and large the detatiled construction of the flow meter illustrated by FIGURES 1 and 2 is the same as shown in the aforementioned related Patent 3,103,119.

Referring now to FIGURE 1 of the drawing, it may be seen that the mass flow meter of the present invention constitutes an encased assemblage which can be interposed physically in a closed conduit such as a pipe line. The flowing gas being metered enters a cylindrical casing 10 through an inlet 11 and leaves by way of outlet 12.

An orifice plate 13 transversely disposed across the flow path is peripherally secured to the inner wall of casing 10 in any suitable manner which prevents gas leakage, e.g., by welding. Save for a machined circular orifice opening 14 centrally thereof, plate 13 blocks the flow path. Ideally, orifice opening 14 is of the sharp-edged type illustrated in the drawing.

Back of plate 13 is an annular spider 16 also transversely disposed across the flow path and peripherally secured as by welding to the inner wall of cylindrical casing 10. A plurality of openings 17 are spaced part on spider 16 for flow of gas through to outlet 12. Mounted at or adjacent to the inner periphery of spider 16 is one end of a double bellows 21, 22. The other end of double bellows 21, 22 is seated on a back plate 15. Bellows 21, 22 are hermetically sealed to both back plate 15 and spider 16 by soldering, welding, brazing, or other type of hermetic sealing so that the space between bellows 21, 22 constitutes a closed bellows chamber. An appropriate fluid is sealed inside this chamber. When the mass flow meter is to be used with gases which follow closely the perfect gas laws, any permanent gas, e.g., air, nitrogen, helium, argon, etc., can be sealed inside the bellows chamber to form the principal component of the gas phase therein. When a gas deviating significantly from the perfect gas laws is to be metered, the gas sealed inside the bellows should be of the same composition as the gas being metered. In addition to the permanent gas, a condensable fluid is added to the bellows to provide temperature compensation for the spring constant of the bellows. As has been already indicated, the condensable fluid in liquid state occupies from about 0.5–25% of the bellows volume at maximum pressure and minimum temperature. The expansion or contraction of bellows 21, 22 with line pressure and temperature is thereby related very closely to the pressure-temperature properties of the flowing gas being metered.

The end of plug 25 is shaped generally according to the following equation:

$$(2) \qquad d = \sqrt{D^2 - \frac{4}{\pi}A}$$

where $d$ is the diameter of the plug in the plane of the orifice plate, $D$ is the diameter of the orifice opening, and $A$ is the annular area of the orifice opening.

The plug diameter, $d$, is calculated for several points along its longitudinal axis. Then the contour of the plug is machined to fit the calculated points and be smooth overall according to well known shop practices. Lastly, any necessary diameter reduction is made in accord with laboratory test results for the intended installation (as pressure compensation for the bellows spring constant).

To illustrate that the orifice area may be a conic section, FIGURE 2 shows an actual plug 25 in a position where dotted line 29 is the shortest distance between the periphery of orifice opening 14 and plug 25. In this position the effective area of orifice 24 is the area of the conical frustum swept by dotted lines 29, 29'.

Thus when fluid flows from inlet 11 through annular orifice 24, then through openings 17 in spider 16 and out outlet 12, the bellows 21, 22 reach an equilibrium position based upon the absolute temperature and pressure of the flowing fluid. The bellows in turn fix the area of orifice 24 by fixing the location of shaped plug 25 relative to plate opening 14 at each pressure-temperature condition in accord with Equation 1. As a result, the pressure differential across orifice 24, which may be measured by a manometer or other differential pressure sensing device (not shown) connected to differential pressure taps 18, 19, is related to true mass flow. If the line pressure increases, for example, contraction of the bellows moves backing plate 15 and shaped plug 25 forward, decreasing the area of annular orifice 24, thereby satisfying Equation 1 to insure that the square root of the differential pressure remains proportional to the mass rate of flow at all times. By employment of two phases inside the bellows according to practice of the present invention, temperature induced expansion or contraction of the bellows is also compensated to insure that the square root of the differential pressure remains proportional to the mass rate of flow.

Figure 3:
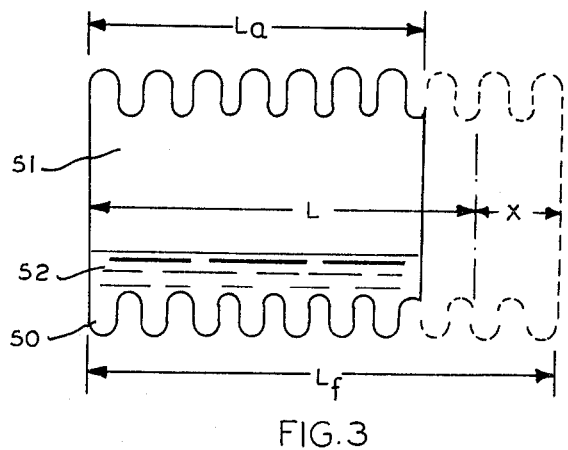
FIGURE 3 diagrammatically illustrates a bellows containing a two phase charging fluid.

An initial basis for selecting the condensable fluid and its quantity as a temperature correction can be determined by relating the mechanics of the bellows spring constant to the operating range of the mass flow meter. FIGURE 3 illustrates diagrammatically three positions of a sealed two-phase bellow 50 containing therein a gas phase 51 and a liquid phase 52 where $L_f$ is the filled length of the bellows;
$L$ is the equilibrium length of the bellows;
$L_a$ is the free length of the bellows.

At filling, the bellows acts as a spring to reach a filled length displaced from the free length by internal pressure according to:

$$(3) \qquad (P_f - P_a)A' = S(L_f - L_a)$$

where $A'$ is the effective bellows area; $P_f$ is the absolute pressure to which the bellows is filled; $P_a$ is the absolute atmospheric pressure; $S$ is the spring constant of the bellows.

$$(4) \qquad P_f = P_{g0} + P_{v0}$$

where $P_{g0}$ is the pressure of the filling gas at filling; $P_{v0}$ is the partial pressure of the vapor at filling; and $P_g$, $P_v$ being these pressures generally.

At any other time, internal Pressure $P_i$ and external Pressure $P$ are similarly in balance at some bellows length $L$.

$$(5) \qquad (P_i - P)A' = S(L - L_a) \text{ or}$$

$$(6) \qquad PA' + S(L - L_a) = P_i A' = A'(P_g + P_v)$$

Assuming that the filling gas obeys the perfect gas laws:

$$(7) \qquad P_i = P_v + P_g = P_v + P_{g0}\frac{T}{T_f} \cdot \frac{V_{g0}}{V_g}$$

where $T$ is the temperature (absolute); $T_f$ is the filling $T$ and $V_g$ is the gas volume; $V_{g0}$ is the gas volume in the bellows at filling; $V_v$ is the liquid volume; $V_{v0}$ is the liquid volume at filling.

Then from Equations 6, 7

$$(8) \qquad P + \frac{S}{A'}(L - L_a) = P_v + P_{g0}\frac{T}{T_f} \cdot \frac{V_{g0}}{V_g}$$

Since the displacement distance $X = L_f - L$, then $$(9) \qquad L - L_a = L_f - X - L_a = (L_f - L_a) - X$$

and Equation 8 becomes $$(10) \qquad P + \frac{S}{A'}(L_f - L_a) - \frac{S}{A'}X = P_v + P_{g0}\frac{T}{T_f} \cdot \frac{V_{g0}}{V_g}$$

subsituting from Equation 3 the $$\frac{S}{A'}(L_f - L_a)$$

expression $$(11) \qquad P + (P_f - P_a) - \frac{S}{A'}X = P_v + P_{g0}\frac{T}{T_f} \cdot \frac{V_{g0}}{V_g}$$

Since $V_{g0} = A'(L_f - L_{v0})$; $V_g = A'(L - L_v)$; where $L_v$ is the length occupied by the liquid and $L_{v0}$ that at charging, then $$(12) \qquad P = (P_f - P_a) - \frac{S}{A'}X = P_v + P_{g0}\frac{T}{T_f} \cdot \frac{A'(L_f - L_{v0})}{A'(L - L_v)}$$

In general $V_v$ is approximately equal to $V_{v0}$; $V_v$ is much smaller than V and $L_{v0}$ is much smaller than $L_f$; $L_v$ is much smaller than L.

Equation 12 may be revised to $$(13) \quad P+(P_f-P_a)\frac{S}{A'}X=P_v+P_{g0}\frac{T}{T_f}\frac{L_f}{L_f-X}$$

A good approximation for the vapor pressure of the charging liquid is:

$$(14) \quad P_v=C_e^{-BT^{-1}}$$
$$P_{v0}=C_e^{-BT_f^{-1}}$$
$$\text{at } T=T_f$$

Substituting these expressions and (4) in (13)

$$(15) \quad P+(P_f-P_a)\frac{S}{A'}X=C_e^{-BT^{-1}}+\frac{(P_f-C_e^{-BT_f^{-1}})TL_f}{T_f(L_f-X)}$$

When no condensable vapor is added, Equation 15 becomes $$(16) \quad P+(P_f-P_a)\frac{S}{A}X=\frac{P_fLT_f}{(L_f-X)T_f}$$

In principle there are now several variables so that with a condensable fluid present, X can be made a function of the density:

$$(17) \quad X=\ell\left(\rho_0\frac{P}{T}\right)$$

By way of specific example there is an instance where it is desired to measure mass air flow over the following range:

Temperature between 50° F. and 90° F., which in absolute terms is

Temperature between 509.7° R. and 549.7° R.
Pressure between 30 and 46 p.s.i.a.

The density of air $$K\frac{P}{T}=\rho$$

for $\rho$ in grams liter, P in p.s.i.a there is for various values of T.

TABLE 1

| | T., ° (F.) | | | | |
|---|---|---|---|---|---|
| | 50 | 60 | 70 | 80 | 90 |
| K | 0.08483 | .08320 | .08163 | .08012 | .07866 |

A suitable bellows (10 convolutions) has $A'=2.5$ in.$^2$ $S=75$ lbs./inch; $S/A'=30$; $L_a=1.0''$
$T_f=529.7°$ F. (70° F.); $P_a=14.7$ p.s.i.a.

If $P_f=18$ p.s.i.a., then $P_f-P_a=3.3$ p.s.i.a.

$$\left(L_f=L_a+(P_f-P_a)\frac{A'}{S}=1.0+0.11=1.11\right)$$

Equation 16 becomes:

$$(18) \quad P=30X-3.3+\frac{0.3772T}{1.11-X}$$

where

P is in p.s.i.a.
T is ° R.
X is inches

Solving Equation 18 for various isotherms in the instrument range gives the following tabulated values:

TABLE 2

| T., ° (F.) | x | P | ρ |
|---|---|---|---|
| 50 | .3 | 29.44 | 2.497 |
| | .35 | 32.50 | 2.757 |
| | .4 | 35.77 | 3.034 |
| | .45 | 39.33 | 3.336 |
| | .5 | 43.14 | 3.660 |
| 60 | .3 | 29.91 | 2.489 |
| | .35 | 33.00 | 2.746 |
| | .4 | 36.30 | 3.020 |
| | .45 | 39.90 | 3.320 |
| | .5 | 43.75 | 3.640 |
| 70 | .3 | 30.38 | 2.480 |
| | .35 | 33.49 | 2.734 |
| | .4 | 36.83 | 3.006 |
| | .45 | 40.47 | 3.304 |
| | .5 | 44.37 | 3.622 |
| 80 | .3 | 30.84 | 2.471 |
| | .35 | 33.99 | 2.723 |
| | .4 | 37.36 | 2.993 |
| | .45 | 41.04 | 3.288 |
| | .5 | 44.98 | 3.604 |
| 90 | .3 | 31.31 | 2.463 |
| | .35 | 34.49 | 2.713 |
| | .4 | 37.90 | 2.981 |
| | .45 | 41.61 | 3.273 |
| | .5 | 45.60 | 3.587 |

It should be noted that for a constant $x$, $\rho$ varies over the T ° range from 2.981 to 3.034 or about 1.8%.

According to the practice of this invention a suitable liquid is selected which over the working range will produce a compensating pressure so that $\Delta\rho$ is reduced. In this instance nitromethane is satisfatcory; it has the following partial pressure characteristics:

TABLE 3

| | T., ° F. | | | | |
|---|---|---|---|---|---|
| | 50 | 60 | 70 | 80 | 90 |
| $C_e^{-BT^{-1}}=P_v$ | 0.250 | .390 | .533 | .728 | 1.000 |

If sufficient nitromethane is added so that some liquid is present over the entire working range then the isotherms can be computed from Equation 15 at the same filling T ° (70° F.) and pressure (18 p.s.i.a.) with $L_f=1.11$; $P_x-P_a=3.3$ $$(19) \quad P=30X-3.3+\frac{17.467\times1.11T}{(1.11-X)(529.7)}+C_e^{-BT^{-1}}$$

The following table shows the isotherms with nitromethane:

TABLE 4

| T., ° (F.) | x | P | ρ |
|---|---|---|---|
| 50 | .3 | 28.99 | 2.459 |
| | .35 | 32.00 | 2.715 |
| | .4 | 35.22 | 2.988 |
| | .45 | 38.71 | 3.284 |
| | .5 | 42.45 | 3.601 |
| 60 | .3 | 29.58 | 2.461 |
| | .35 | 32.62 | 2.714 |
| | .4 | 35.87 | 2.984 |
| | .45 | 39.41 | 3.279 |
| | .5 | 43.19 | 3.593 |
| 70 | .3 | 30.18 | 2.464 |
| | .35 | 33.25 | 2.714 |
| | .4 | 36.53 | 2.982 |
| | .45 | 40.10 | 3.273 |
| | .5 | 43.93 | 3.586 |
| 80 | .3 | 30.82 | 2.469 |
| | .35 | 33.92 | 2.718 |
| | .4 | 37.24 | 2.984 |
| | .45 | 40.85 | 3.273 |
| | .5 | 44.72 | 3.583 |
| 90 | .3 | 31.55 | 2.482 |
| | .35 | 34.68 | 2.728 |
| | .4 | 38.03 | 2.991 |
| | .45 | 41.68 | 3.279 |
| | .5 | 45.60 | 3.587 |

For a constant X (e.g. 0.4) the variation is from 2.991 to 2.982 or 0.3%. Even at the worst point (lowest density) the variation is less than 1% of density.

Still another example is the bellows connection for a flow meter intended to measure mass flow of oxygen over a range of:

$$-5° \text{ F.} \leq T \leq +121° \text{ F.}$$

$$95 \text{ p.s.i.a.} \leq P \leq 155 \text{ p.s.i.a.}$$

Figure 4:
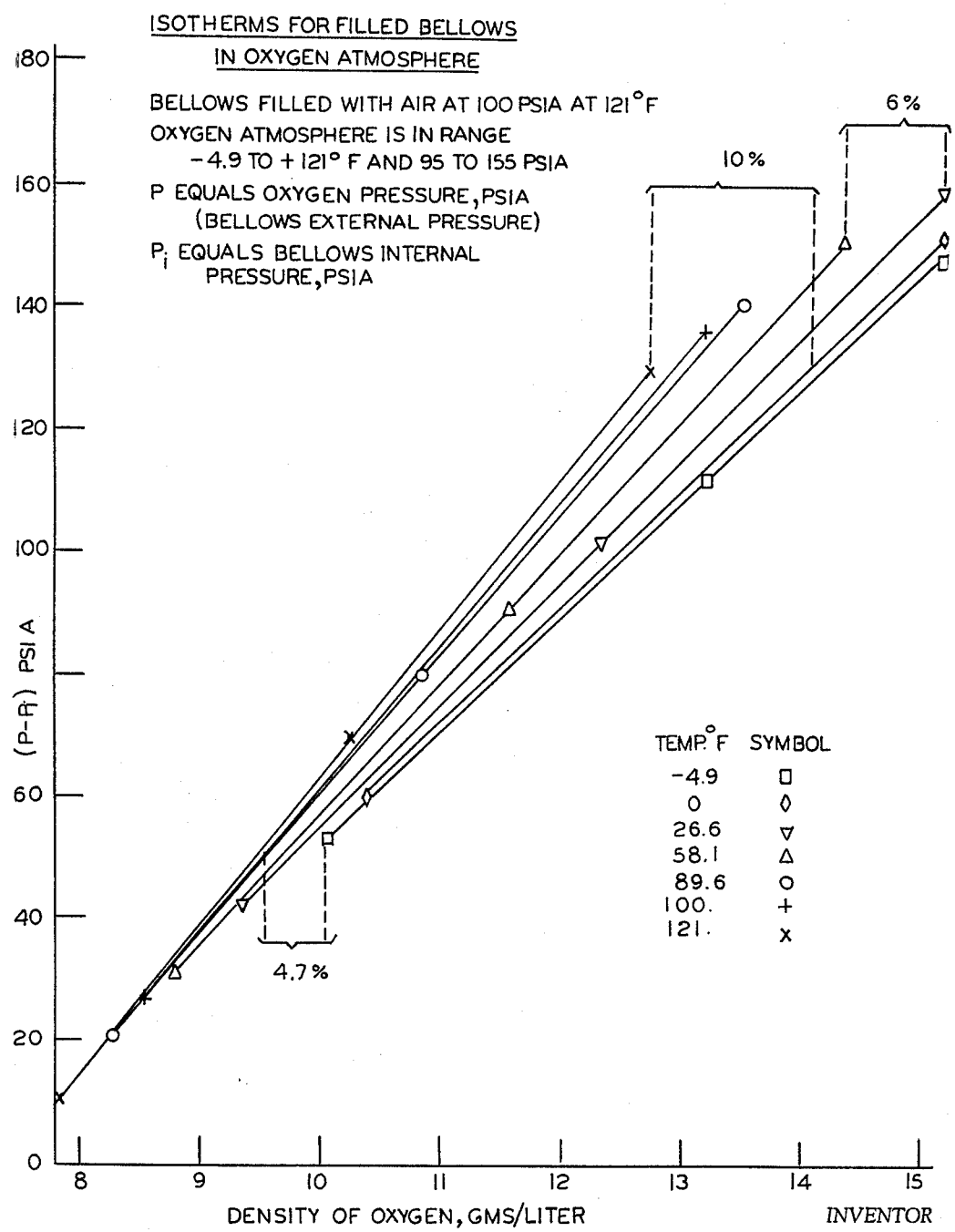
FIGURES 4 and 5 are graphs showing isotherms for a filled bellows.

In this instance the bellows was a thick-walled stainless steel bellows having a high stiffness. Air was employed inside the bellows. FIGURE 4 shows graphically the isotherms. At the lower extreme the deviation attributable to the spring constant of the bellows was 4.7%; at the upper extreme it was 6%; the greatest spread was 10%. The data is plotted in FIGURE 4 as $(P-P_i)$ against $\rho$.

Figure 5:
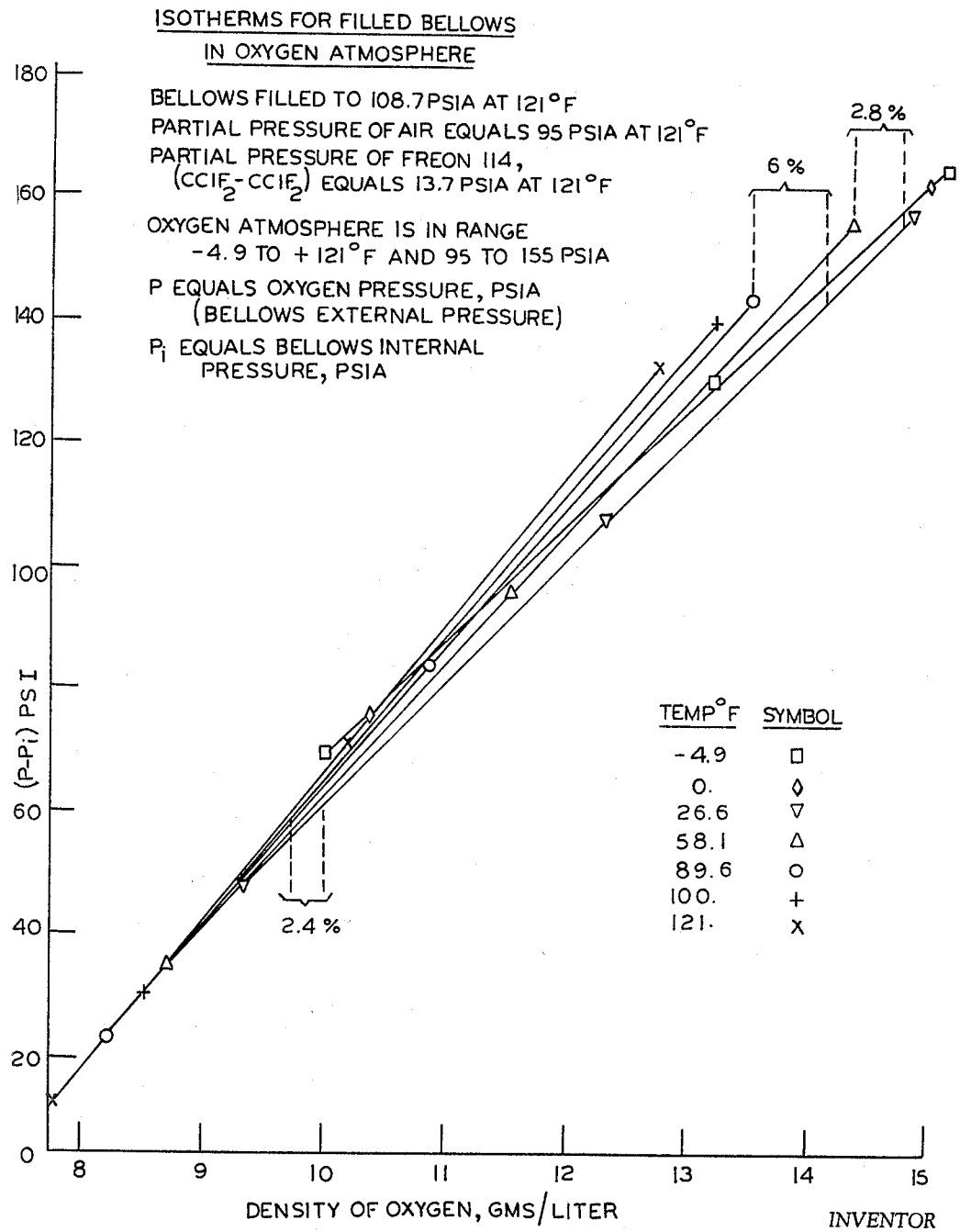

Addition of charging liquid in amount which vaporizes completely in the operating range reduced the spread from 10% to a more acceptable 6% and improved the behavior at the ends of the range to 2.4% and 2.8%, respectively, at the lower and upper ends. The liquid was Freon 114 ($Cl_2FC-CFCl_2$) and it was employed with air to fill the bellows to a partial pressure of air of 95 p.s.i.a. and of Freon of 13.7 p.s.i.a., both at 121° F. FIGURE 5 graphically shows the isotherms for the mixture and how the spread was reduced.

The above theoretical discussion and working examples show to what an extent inclusion of a volatile liquid inside the bellows can serve as a temperature correction to counteract the spring constant of the bellows. There remains for the practice of the present invention a trial and error factor in selection of a particular volatile liquid and of the amount of volatile liquid to be employed, which best fits the pre-existing requirements for the mass flow meter, i.e., to match the expected pressure and temperature variation in the flow of the gas being metered. Fortunately, selection of a proper liquid presents no serious problem since an extremely large number of stable, volatile liquids are available. Thus, for metering low temperature gases, carbon dioxide can be the condensable fluid and employed in conjunction with a permanent gas such as hydrogen, helium, nitrogen, etc. to the form two phases inside bellows 21. On the other hand, for measurement of mass flow at high temperature, relatively nonvolatile materials such as paracymene or meta-xylene may be employed along with a permanent gas to form the two phases desired inside the bellows structure.

Generally the volatile liquid to be added to the gas inside the bellows is selected from among the commercially available pure liquids of known physical properties including for example the lower hydrocarbons such as the $C_1$ to $C_8$ alkanes (methane, ethane, propane, butane, isobutane, etc.). The fluorinated hydrocarbons, particularly the Freons, are quite good. Generally the aliphatic hydrocarbons and the halogenated aliphatic hydrocarbons are preferred when the gas being metered is refrigerated (i.e., below ambient temperatures). Following are some of the liquids which have been found satisfactory in various specific low temperature meters: methane, ethane, propane, butane, pentane, heptane, hexane, octane, isobutane, isopentane, the Freons (F11, F12, F21, F113, F114, F22, methyl chloride, methylene chloride, carbon tetrachloride, ethyl chloride, carbon dioxide, and sulfur dioxide. Where the gas being metered is above ambient temperature, oxygenated organic compounds have proved most suitable, including for example, ethyl ether, ethyl alcohol, methyl alcohol, acetone, isopropyl, and propyl alcohol, isobutyl alcohol, normal butyl alcohol. Water is a perfectly suitable fluid for purposes of the present invention at moderately elevated temperatures. On occasion, more than one liquid should be employed for a particular metering installation.

While the present invention and its practice has been described in terms of preferred embodiments, it should be appreciated that other forms of mass flow meters may be employed such as for example the mode disclosed in related patent application, S.N. 305,402, filed August 29, 1963. It will be understood that variations and modifications can be effected within the spirit and scope of the invention as described hereinabove and as defined in the appended claims.

What is claimed is:

1. In an instrument for measuring mass flow of a gas comprising an annular orifice through which the gas passes formed between a plate member disposed transversely across the flow path and a shaped plug extending into the opening, said plate and plug being relatively movable whereby the area of said annular orifice is varied; a closed; fluid filled bellows for relatively moving the plate and plug according to line temperature and pressure changes of the flowing gas whereby the square root of the pressure differential across the orifice is proportional to the mass flow of the gas over a wide temperature and pressure range; and means for measuring the pressure differential across said orifice, the improvement which comprises: both a liquid and a permanent gas as the fluid filling the bellows, the liquid being relatively volatile over the normal operating temperature range of said instrument, whereby evolution of vapors from said volatile liquid provide temperature compensation for the spring constant of the fluid filled bellows over changes in the bellows length attributable to line temperature changes in the flowing gas.

2. The apparatus of claim 1 wherein at the minimum temperature and maximum pressure of the operational range of said instrument the liquid occupies not more than about 25% of the volume inside said bellows.

3. The apparatus of claim 1 wherein at the maximum temperature and minimum pressure of the operational range of said instrument all of the liquid inside the bellows has vaporized to form a single gas phase inside said bellows.

4. The apparatus of claim 1 wherein at the maximum temperature and minimum pressure of the operational range of said instrument some liquid is still present inside the bellows.

5. In an instrument for measuring mass flow of a gas comprising an annular orifice through which the gas passes; a shaped plug disposed centrally of said orifice movable with respect to the orifice whereby the area of said annular orifice is varied; a closed fluid filled bellows connected to said plug for moving said plug according to line temperature and pressure changes of the flowing gas whereby the square root of the pressure differential across the orifice is proportional to the mass flow of the gas over a wide temperature and pressure range; and means for measuring the pressure differential across said orifice, the improvement which comprises: both a liquid and a permanent gas as the fluid filling the bellows, the liquid being relatively volatile over the normal operating temperature range of said instrument whereby evolution of vapors from said volatile liquid provide temperature compensation of the spring constant of the fluid filled bellows over changes in the bellows length attributable to line temperature changes in the flowing gas.

References Cited by the Examiner

UNITED STATES PATENTS

| | | | |
|---|---|---|---|
| 1,559,022 | 11/1925 | Wensley | 73—368 X |
| 1,915,265 | 6/1933 | Bichowsky | 73—368.2 |
| 2,120,938 | 6/1938 | Kronmiller | 73—368.1 X |
| 2,341,765 | 2/1944 | Erbguth | 73—368.1 |
| 2,713,272 | 7/1955 | Granberg | 73—233 X |
| 3,103,119 | 9/1963 | Steele | 73—210 |

RICHARD C. QUEISSER, *Primary Examiner.*

E. D. GILHOOLY, *Assistant Examiner.*